US012624938B2

(12) United States Patent
Hong et al.

(10) Patent No.: US 12,624,938 B2
(45) Date of Patent: May 12, 2026

(54) METHOD FOR MANUFACTURING STRAIN SENSOR BY CONTROL OF THIN-FILM CRACK USING STRESS CONCENTRATION STRUCTURE AND STRAIN SENSOR MANUFACTURED USING SAME

(71) Applicant: SEOUL NATIONAL UNIVERSITY R&DB FOUNDATION, Seoul (KR)

(72) Inventors: Yongtaek Hong, Seoul (KR); Taehoon Kim, Seoul (KR); Daesik Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 386 days.

(21) Appl. No.: 18/272,750

(22) PCT Filed: Jan. 18, 2022

(86) PCT No.: PCT/KR2022/000912
§ 371 (c)(1),
(2) Date: Nov. 2, 2023

(87) PCT Pub. No.: WO2022/154638
PCT Pub. Date: Jul. 21, 2022

(65) Prior Publication Data
US 2024/0142217 A1 May 2, 2024

(30) Foreign Application Priority Data
Jan. 18, 2021 (KR) ........................ 10-2021-0006673

(51) Int. Cl.
*G01B 7/16* (2006.01)
*B41M 3/00* (2006.01)

(52) U.S. Cl.
CPC ............... *G01B 7/18* (2013.01); *B41M 3/008* (2013.01)

(58) Field of Classification Search
None
See application file for complete search history.

(56) References Cited

U.S. PATENT DOCUMENTS 9,970,832 B2     5/2018   Hong et al.
2016/0341688 A1   11/2016   Lim
                  (Continued)

FOREIGN PATENT DOCUMENTS

CN      107478148 A   * 12/2017   ............... G01B 7/18
CN      107478148 B   *  3/2020   ............... G01B 7/18
                  (Continued)

OTHER PUBLICATIONS

PCT International Search Report, PCT/KR2022/000912, Apr. 26, 2022, 5 Pages.

*Primary Examiner* — Peter J Macchiarolo
*Assistant Examiner* — Jermaine L Jenkins
(74) *Attorney, Agent, or Firm* — Fenwick & West LLP

(57) ABSTRACT

A method for manufacturing a strain sensor comprises the steps of: preparing a solution to be used as a conductive thin-film material and a flexible substrate; forming, on the flexible substrate, a stress concentration structure by repeatedly depositing a micro notch formed to have a structure having a boundary on a two-dimensional plane (the xy plane) or have a three-dimensional structure having a boundary in a direction perpendicular to the plane (the z direction); and forming a strain sensor by depositing a conductive thin film on the flexible substrate in such a way that the conductive thin film overlaps at least a portion of the stress concentration structure. Accordingly, the stress concentration structure can be manufactured at a desired location through patterning, and can be applied for various purposes (Continued)

by controlling the sensitivity and linearity by adjusting the arrangement of the structure and the thickness of the conductive thin film.

13 Claims, 16 Drawing Sheets

(56)                References Cited

U.S. PATENT DOCUMENTS

| 2016/0377493 | A1 |   | 12/2016 | Hong et al. |
| 2018/0045589 | A1* |  | 2/2018 | Yu ......................... G01L 1/2287 |

FOREIGN PATENT DOCUMENTS

| CN | 111251688 | A | * | 6/2020 | ............. B32B 15/08 |
| CN | 109827681 | B |   | 9/2020 | |
| CN | 109839232 | B |   | 11/2021 | |
| KR | 10-1500840 | B1 |   | 3/2015 | |
| KR | 10-2019-0091876 | A |   | 8/2019 | |
| KR | 10-2060678 | B1 |   | 12/2019 | |
| KR | 10-2020-0095145 | A |   | 8/2020 | |
| KR | 10-2020-0097479 | A |   | 8/2020 | |

* cited by examiner

FIG. 2A
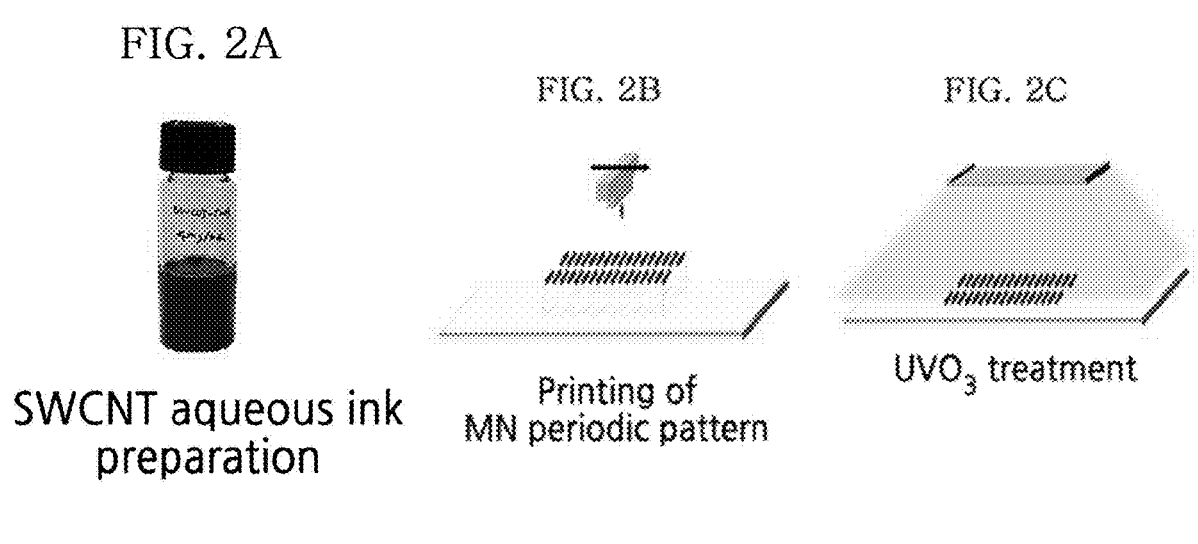
SWCNT aqueous ink
preparation
FIG. 2B
Printing of
MN periodic pattern
FIG. 2C
UVO$_3$ treatment
FIG. 2D
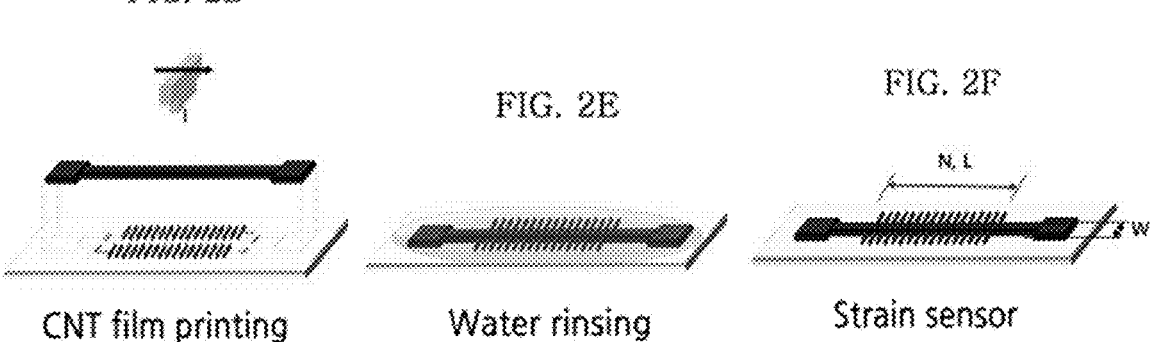
CNT film printing
FIG. 2E
Water rinsing
FIG. 2F
Strain sensor Cracks at different positions Micro Notch Cracks at MN pattern MN structure Crack bridging in CNT Film Brittle Region Tough Region Width of Tough Region

METHOD FOR MANUFACTURING STRAIN SENSOR BY CONTROL OF THIN-FILM CRACK USING STRESS CONCENTRATION STRUCTURE AND STRAIN SENSOR MANUFACTURED USING SAME

TECHNICAL FIELD

The present invention relates to a method for manufacturing a strain sensor by control of thin-film crack using a stress concentration structure and a strain sensor manufactured using the same, and more particularly, to manufacturing a sensitive sensor by controlling a crack in a conductive thin-film on a flexible substrate through a stress concentration structure and applying the crack control.

BACKGROUND ART

A flexible, stretchable pressure/strain sensor is a sensor that is capable of detecting physical deformation caused by an external force, and a resistance-based sensor has been widely developed, generally using a property of increase in resistance of a metal conductor due to external deformation.

A previously invented resistance-based sensor is broadly classified as either (1) a sensor based on a deposited metal thin-film or (2) a sensor based on a conductive nanomaterial with good mechanical properties, such as a carbon nanotube, graphene, or silver nanowire, and a polymer composite.

In general, in case of the former, high sensitivity is shown due to a greater change in resistance even for small deformation, but there is a disadvantage of only being able to be used in a very limited tensile environment. In case of the latter, it is possible to operate in a wide range of tensile environments due to the good mechanical properties of the material, but there is a problem of low sensitivity due to an insignificant change in resistance.

DISCLOSURE

Technical Problem

Accordingly, the present invention is directed to solving the technical problem in this regard, and an object of the present invention is to provide a method of manufacturing a strain sensor by control of thin-film crack using a stress concentration structure.

Another object of the present invention is to provide a strain sensor manufactured using a method of manufacturing a strain sensor by control of thin-film crack using the stress concentration structure.

Technical Solution

A method of manufacturing a strain sensor by control of thin-film crack using a stress concentration structure, according to an embodiment for achieving the object of the present invention described above, the method includes: preparing a solution to be used as a conductive thin-film material for a strain sensor and a flexible substrate to form the strain sensor; forming a stress concentration structure on the flexible substrate by repeatedly depositing a micro notch (MN), which is formed to have a structure having a boundary in a two-dimensional plane (xy plane) or a three-dimensional structure having a boundary in a direction perpendicular to the plane (z direction); and forming a strain sensor by depositing a conductive thin-film on the flexible substrate so as to overlap at least a portion of the stress concentration structure.

In an embodiment of the present invention, in the forming of the stress concentration structure, the stress concentration structure may be patterned into an array structure that has a predetermined spacing in the form of a bar.

In an embodiment of the present invention, in the forming of the stress concentration structure, a conduction path of current flowing through the flexible substrate may be controlled by controlling a crack that is formed on the flexible substrate through an arrangement of micro notches.

In an embodiment of the present invention, in the forming of the stress concentration structure, as a spacing between the micro notches gets closer, cracks at the boundary of the stress concentration structure may merge together to determine a growth length of the crack, and the crack may block the conduction path to reduce a current flow.

In an embodiment of the present invention, in the forming of the stress concentration structure, the micro notch having a sharp boundary may be formed using at least one of the processes of printing, molding, deposition, and photolithography.

In an embodiment of the present invention, in the forming of the strain sensor by depositing the conductive thin-film, a change in resistance in response to stress in the conductive thin-film may be controlled.

In an embodiment of the present invention, in the forming of the strain sensor by depositing the conductive thin-film, a length and growth rate of the crack on the conductive thin-film may be controlled by adjusting the number and length of micro notches and a thickness of the conductive thin-film.

In an embodiment of the present invention, in the forming of the strain sensor by depositing the conductive thin-film, a conduction path of the conductive thin-film may be controlled by controlling the length and growth rate of the crack in the conductive thin-film.

In an embodiment of the present invention, the method of manufacturing a strain sensor by control of thin-film crack using a stress concentration structure may further include rinsing with deionized water; and drying with a hot plate, when a single-walled carbon nanotube ink (SWCNT ink) is used.

In an embodiment of the present invention, the conductive thin-film material may include at least one of silver nanowires (AgNWs), a single-walled carbon nanotube (SWCNT), a multi-walled carbon nanotube (MWCNT), zinc-oxide nanowires (ZnONWs), silver, aluminum, or copper.

In an embodiment of the present invention, the flexible substrate may include at least one of PDMS, silicone rubber, poly-urethane, ecoflex, Dragon-Skin, or stretchable tape.

A strain sensor, according to an embodiment for achieving another object of the present invention described above, is manufactured using the method of manufacturing a strain sensor by control of thin-film crack using a stress concentration structure.

Advantageous Effects

As described above, according to a method of manufacturing a strain sensor by control of thin-film crack using a stress concentration structure and a strain sensor manufactured using the same, a stress concentration structure can be manufactured at a desired location through patterning, and can be applied for various purposes by controlling the sensitivity and linearity by adjusting the arrangement of the structure and the thickness of the conductive thin-film.

The sensor of the present invention can be used in a high tensile environment as well as a low tensile environment, depending on the selection of materials, and can be attached to soft and curved areas for convenience of use. In particular, the sensor operating in a flexible environment can be applied to healthcare devices that detect movement by attaching to various parts of the body, including the human face, or to a new type of human machine interface (HMI) in an environment that requires flexibility and stretchability.

DESCRIPTION OF DRAWINGS

FIGS. 2A to 2F are exemplified views illustrating a method of manufacturing a strain sensor according to an embodiment of the present invention.

MODE FOR DISCLOSURE

Figure 1A:
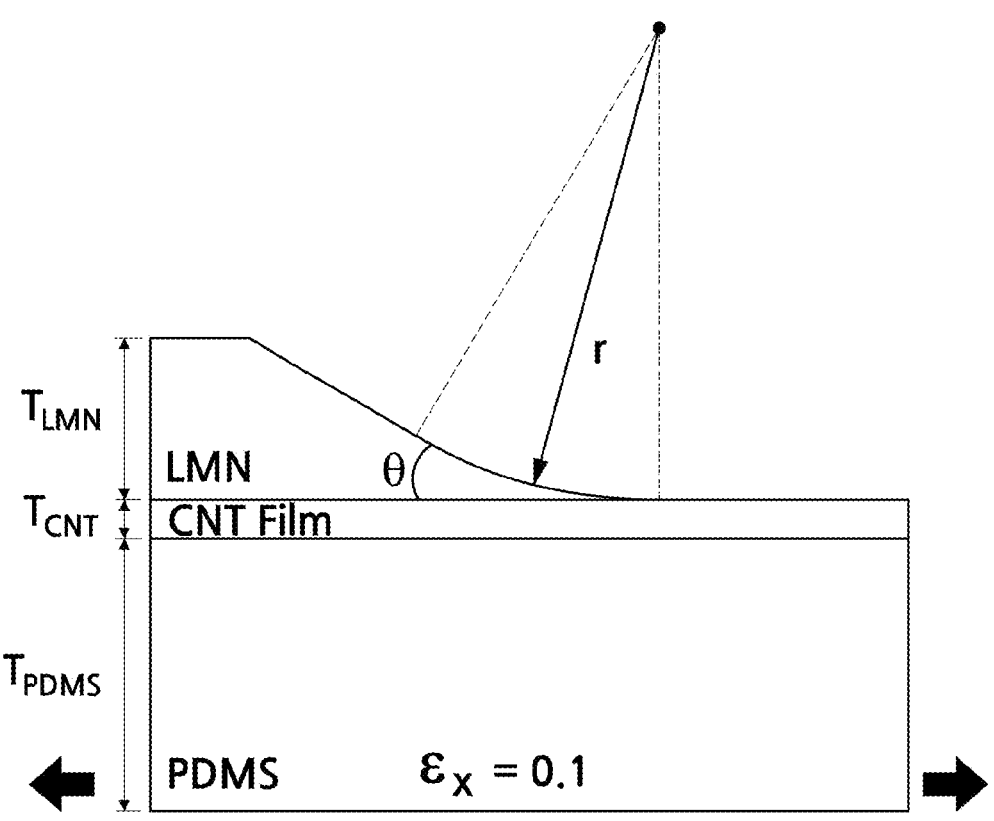
FIGS. 1A to 1C are views for describing a concept of a stress concentrating structure.

The following detailed description of the present invention will be made with reference to the accompanying drawings illustrating specific exemplary embodiments for carrying out the present invention. These exemplary embodiments will be described in detail enough to carry out the present invention by those skilled in the art. It should be understood that various exemplary embodiments of the present invention are different from one another but need not be mutually exclusive. For example, particular shapes, structures, and characteristics described herein in respect to one exemplary embodiment may be implemented in other exemplary embodiments without departing from the spirit and scope of the present invention. In addition, it should be understood that the position or arrangement of each constituent element in the respective disclosed exemplary embodiments may be changed without departing from the spirit and scope of the present invention. Therefore, the following detailed description is not considered as having limited meanings, and the scope of the present invention, if adequately explained, is limited only by the appended claims as well as all the scopes equivalent to the appended claims. Like reference numerals in the drawings refer to the same or similar functions throughout several aspects.

Hereinafter, exemplary embodiments of the present invention will be described in detail with reference to the drawings.

Figure 1B:
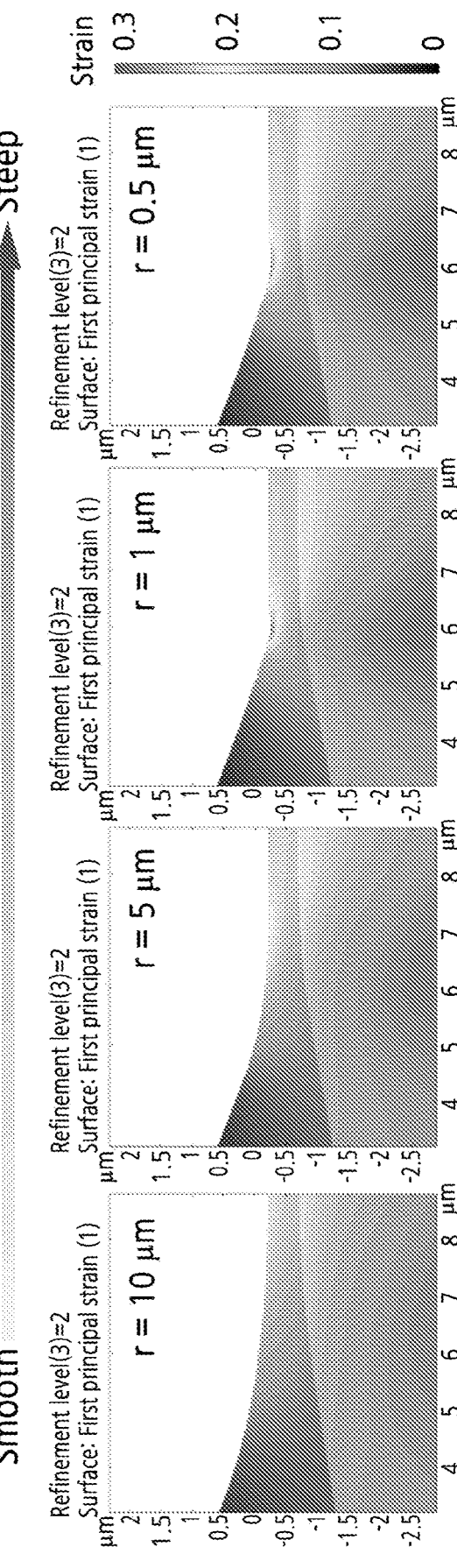
Figure 1C:
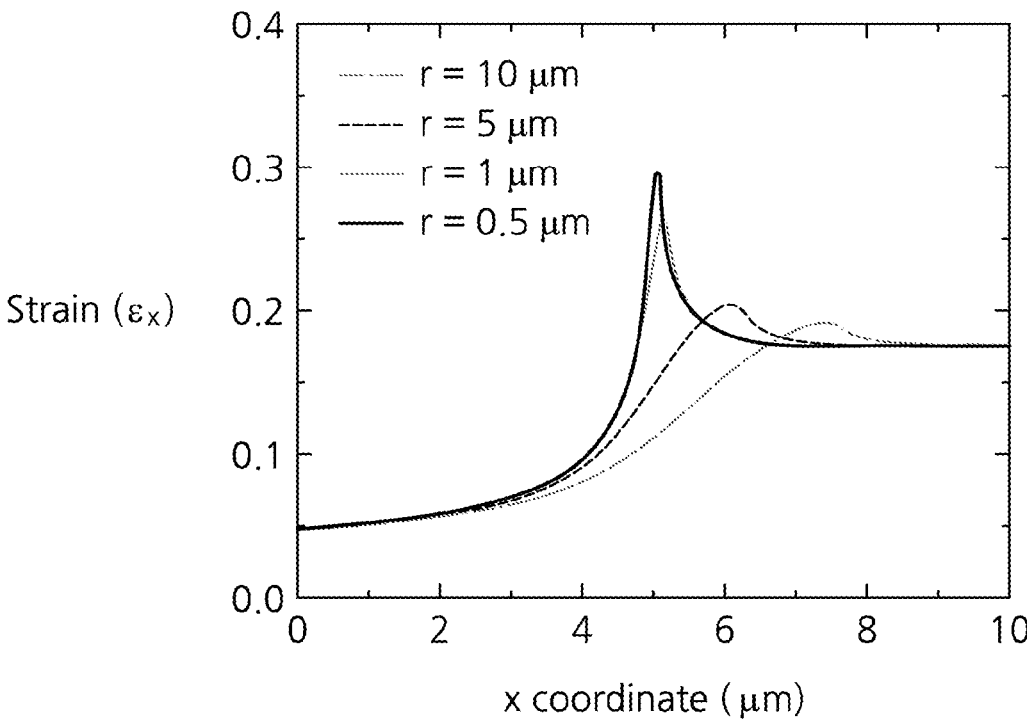

FIGS. 1A to 1C are views describing a concept of a stress concentrating structure.

The present invention relates to a method of controlling a crack in a conductive thin-film on a flexible substrate through a stress concentration structure, and to manufacturing of a sensitive sensor with an application of crack control.

A structure with a sharp edge on a two-dimensional plane that forms a conductive thin-film, or a three-dimensional structure with a sharp boundary in a direction perpendicular to the plane (the xy plane) (the z direction), has an effect of concentrating stresses at the edge and boundary.

A change in resistance is caused through an adjustment of a crack that develops and grows on a conductive thin-film by stresses concentrated around a stress concentration structure in a stress environment. This phenomenon may be applied to a sensor, which may be used as a pressure sensor, strain sensor, or the like, depending on materials and applications.

This sensor is capable of detecting from pulse to joint movement and more, and may be used as a body wearable device. In addition, this sensor may be applied as a new type of human machine interface (HMI) in an environment that requires bending or stretching.

The stress concentration structure developed in the present invention means a structure having a sharp edge on a two-dimensional plane forming a conductive thin-film, or a three-dimensional structure formed with a sharp boundary in a direction perpendicular to the plane (the xy plane) (the z direction).

In addition, the stress concentration structure may be manufactured by a process such as printing, molding, deposition, or photolithography. The conductive thin-film may include brittle-based materials such as silver, aluminum, copper, etc. as well as a flexible carbon nanotube (CNT), graphene, or silver nanowires (AgNWs).

When the thin-film with the stress concentration structure is applied with stress, the stress is concentrated at a boundary of the structure. The stress concentration structure induces rapid crack formation and growth of the thin-film at the boundary. A crack that forms in the thin film in a stress environment may be controlled and manipulated through an arrangement of multiple stress concentration structures.

It is possible to control a length and growth rate of the crack in the thin-film by adjusting a spacing between patterns of the stress concentration structures of the present invention and a thickness of the thin-film, thereby controlling a conduction path of the conductive thin-film. That is, a change in resistance in response to stress of the conductive thin-film may be controlled.

A flexible, stretchable pressure/strain sensor is a sensor that is capable of detecting physical deformation caused by an external force, and a resistance-based sensor has been widely developed, generally using a property of increase in resistance of a metal conductor due to external deformation.

Among the existing resistance-based sensors, a sensor based on a deposited metal thin-film shows high sensitivity due to a greater change in resistance even for small deformation, but there is a disadvantage of only being able to be used in a very limited tensile environment.

In addition, a sensor based on a conductive nanomaterial with good mechanical properties, such as carbon nanotubes, graphene, and silver nanowires, and a polymer composite, is capable of operating in a wide range of tensile environments due to the excellent mechanical properties of the material, but there is a problem of low sensitivity due to an insignificant change in resistance.

Since the sensor for the application of flexibility/stretchability needs to have high sensitivity with a wide range of operation, it can be considered that the present invention has an advantage compared to the related art.

The present invention can manufacture a resistance-based sensor using the stress concentration structure, as described above. Through the pattern arrangement of the stress concentration structure, the degree of change in resistance due to tension of the conductive thin-film may be controlled, and depending on the selection of materials and the arrangement of the stress concentration structure, a high-sensitivity sensor that operates in a low-tensile environment or a high-tensile environment may be manufactured. With reference to FIGS. 1A to 1C, a three-dimensional stress concentration structure and an example in which the three-dimensional stress concentration structure is applied to a crack control and stretchable strain sensor in a carbon nanotube thin-film are shown.

FIG. 1A illustrates a schematic view of a three-dimensional stress concentration structure with a sharp boundary. FIG. 1B illustrates a concentration distribution of strain at the structure boundary when strain is applied depending on the degree of sharpness of the boundary, the result of which is graphed in FIG. 1C. Accordingly, it can be seen that the greater stress is concentrated as the boundary is sharper.

FIGS. 2A to 2F are exemplified views illustrating a method of manufacturing a strain sensor according to an embodiment of the present invention.

First, with reference to FIG. 2A, a solution to be used as a conductive thin-film material for a sensor and a flexible substrate to form the sensor are prepared. The conductive thin film may be a material with good mechanical properties such as silver nanowires (AgNWs), a single-walled carbon nanotube (SWCNT), a multi-walled carbon nanotube (MWCNT), or zinc-oxide nanowires (ZnONWs), as well as a brittle-based material such as silver, aluminum, copper, etc.

In addition to PDMS, silicone rubber, poly-urethane, ecoflex, Dragon-Skin, and stretchable tape may be used as the flexible substrate.

Next, with reference to FIG. 2B, a micro notch (MN) structure with a sharp boundary is repeatedly disposed and formed on the flexible substrate. The micro notch structure with the sharp boundary may be formed based on the processes of printing, molding, deposition, photolithography, etc. The micro notch structure corresponds to a stress concentration structure.

For example, the micro notch structure may be formed as a two-row array structure that has a predetermined spacing in the form of a bar.

Next, with reference to FIG. 2C, when a solution-based conductive material is selected, the flexible substrate on which the micro-notch structure is deposited is subjected to an ultraviolet ozone cleaning (e.g., UVO3) treatment to change the surface properties, thereby facilitating subsequent deposition of a uniform conductive thin-film.

Then, with reference to FIG. 2D, the manufacturing of the strain sensor can be completed by depositing a conductive thin-film to partially overlap the micro-notch structure (CNT film printing).

Here, for example, when a single-walled carbon nanotube ink (SWCNT ink) is used, a process of rinsing with deionized water and drying with a hot plate may be further performed (see FIGS. 2E and 2F). By further performing the above process, the conductivity of the deposited SWCNT electrode can be further improved, and the strain sensor can be manufactured with more improved sensitivity.

FIG. 2F illustrates an example where 30 notch patterns (N=30) are formed, a length of the pattern region is 10 mm (L=10 mm), and a width of the printed CNT film is 1 mm (W=1 mm).

Hereinafter, with reference to FIGS. 3 to 5, the sensor manufactured by the method described above will be described.

Figure 3A:
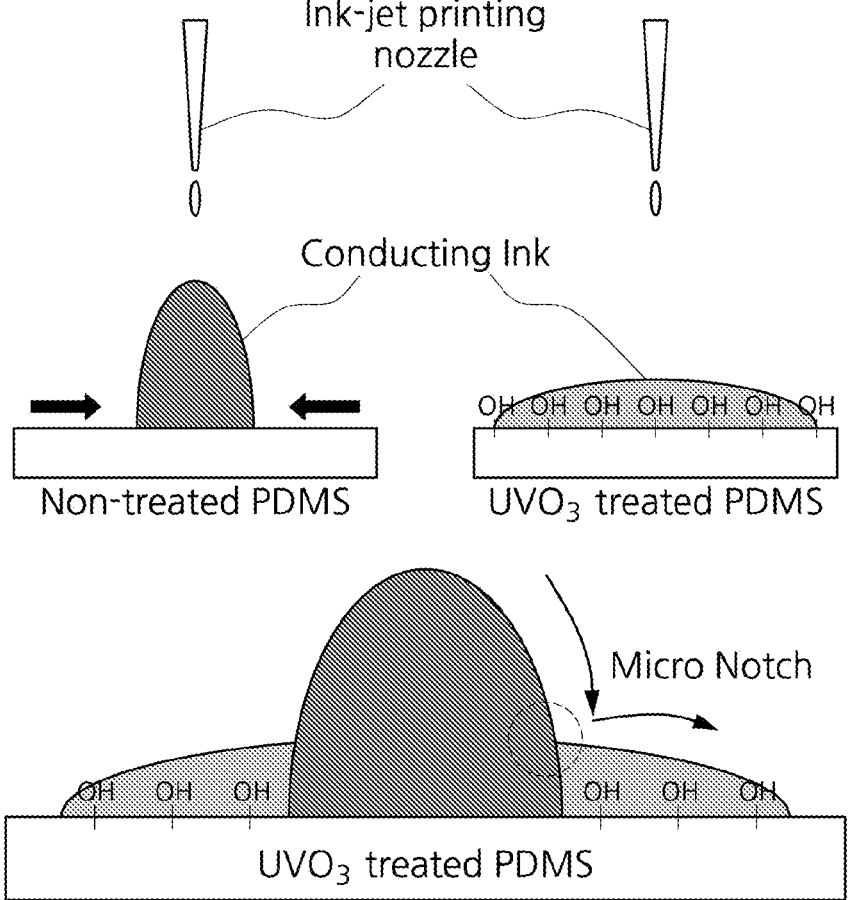
FIGS. 3A to 3C are views for describing a method of forming a stress concentration structure, a boundary crack formation, and a strain concentration phenomenon.

FIG. 3A illustrates a three-dimensional stress concentration structure and a conductive thin-film deposited on top thereof. The stress concentration structure and conductive thin-film may be made of a flexible carbon nanotube (CNT), graphene, or silver nanowires (AgNWs), as well as brittle-based materials such as silver, aluminum, copper, and the like, and may be manufactured by a variety of methods of inkjet printing, molding, deposition, or photolithography, depending on the materials.

Figure 3B:
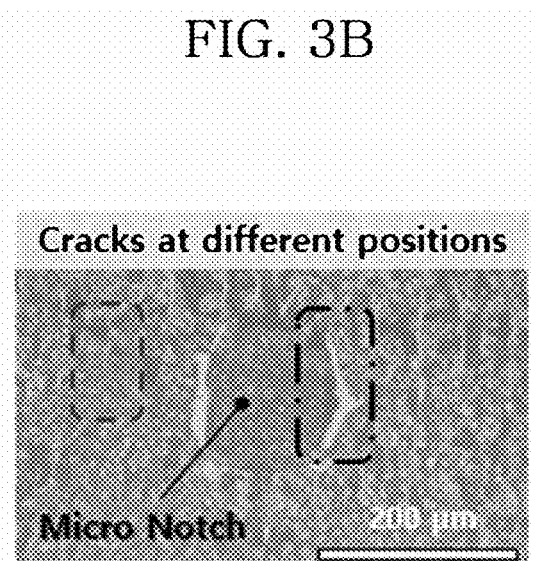
Figure 3B:
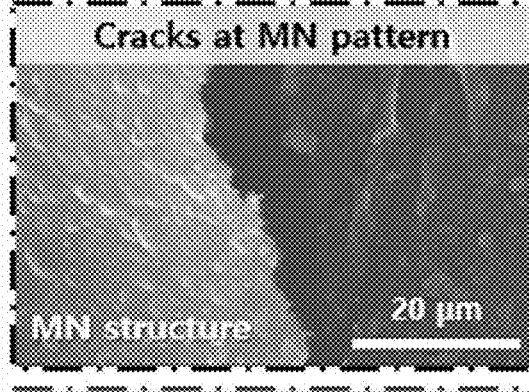
Figure 3B:
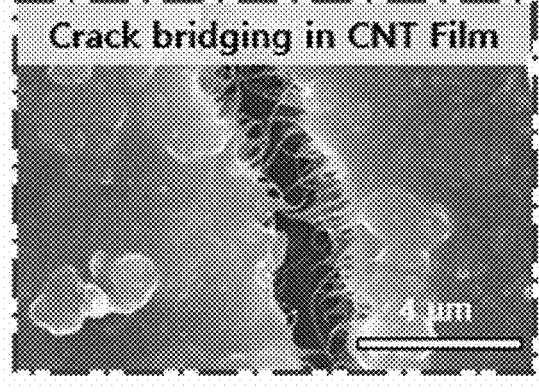

FIG. 3B illustrates that when a tension is applied to the conductive thin-film, a large crack forms at the boundary of the stress concentration structure. Under the same tension, it can be seen that a size and length of a crack formed at the structure boundary is larger than a crack formed in a general thin-film.

Figure 3C:
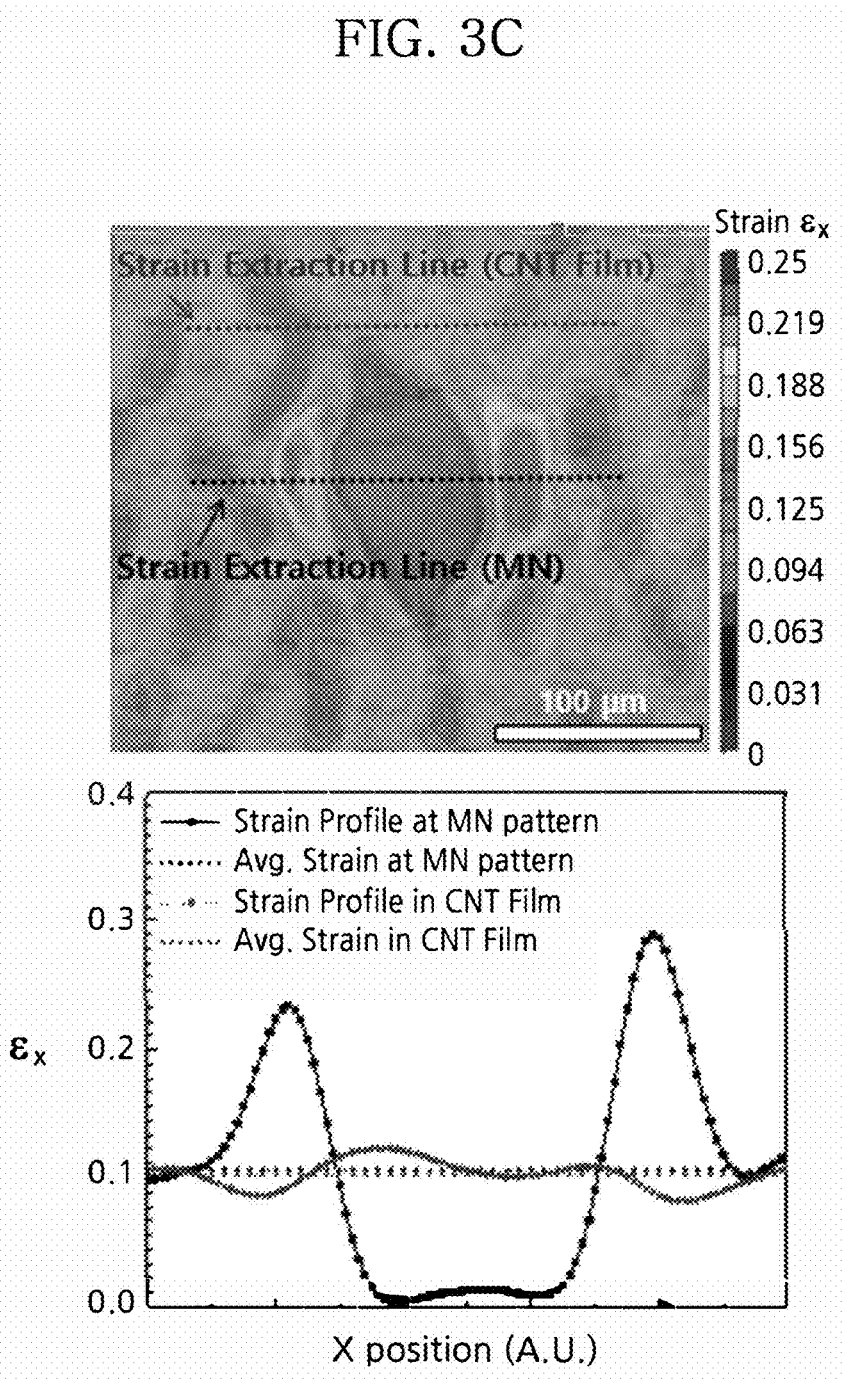

FIG. 3C illustrates a strain distribution concentrated at the boundary of the stress concentration structure when a 10% tension is applied from the outside. While FIG. 1 is a simulation result, FIG. 3 is a result of a stress concentration structure that is actually implemented.

Figure 4A:
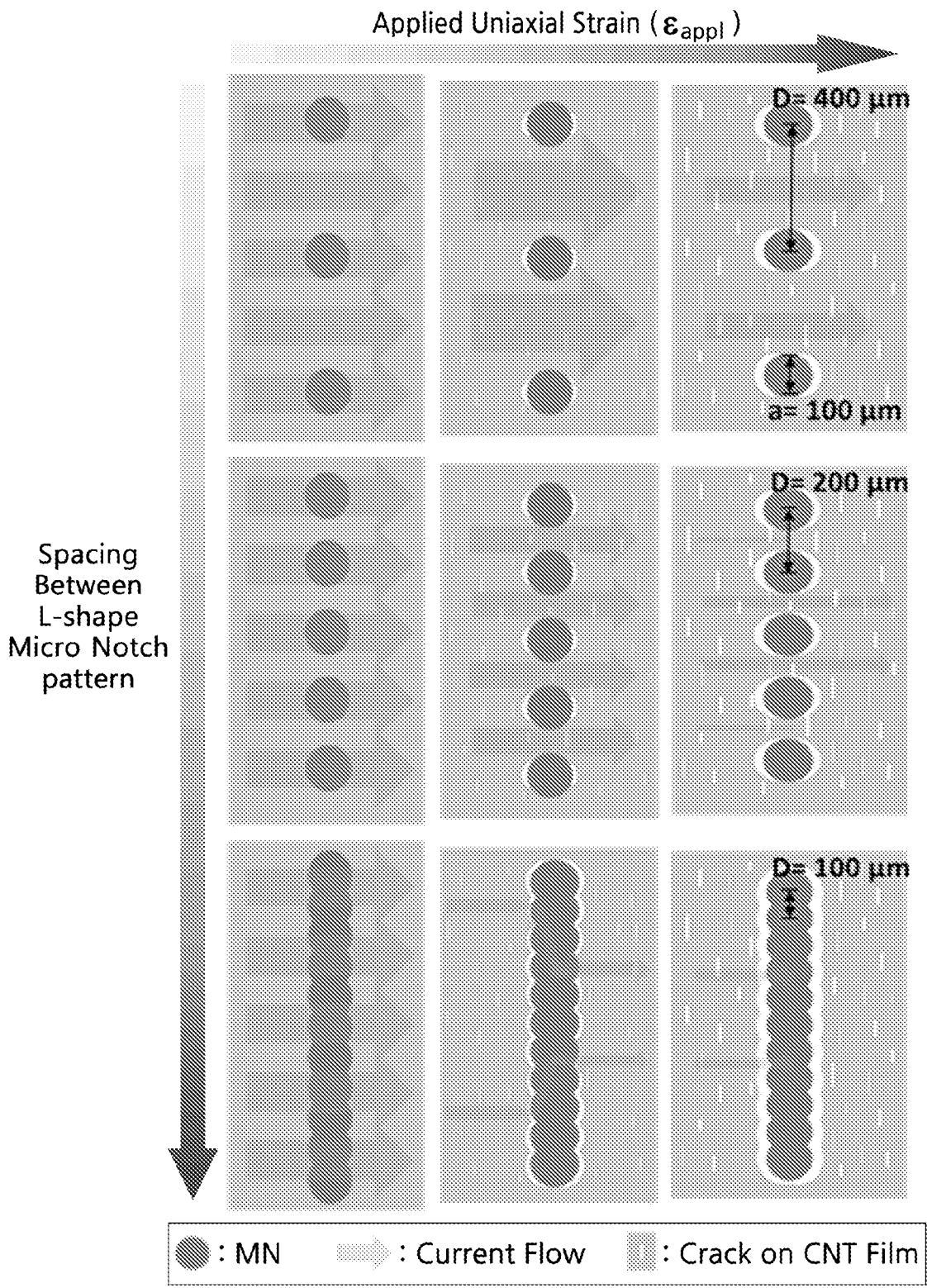
FIGS. 4A to 4C are views for describing a principle of adjusting a characteristic of change in resistance of a carbon nanotube (SWCNT) electrode through an arrangement of a stress concentration structure.

FIG. 4A is a schematic view illustrating the controlling of a conduction path of a current flowing through the thin-film by controlling the cracks that form in the thin-film through the arrangement of stress concentration structure (micro notch structure, MN).

As the spacing between stress concentrating structures gets closer, cracks at the structure boundary merge together, which determines a growth length of the crack. These cracks block the conduction path, thereby reducing a current flow.

Figure 4B:
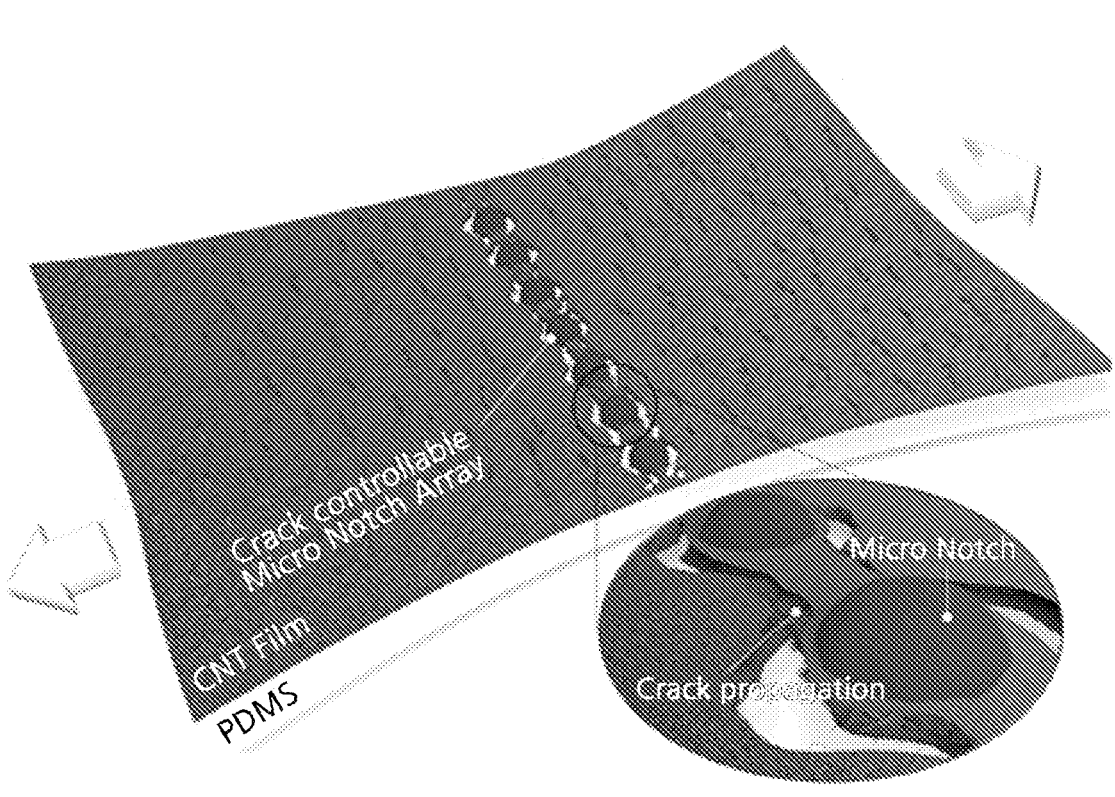
Figure 4C:
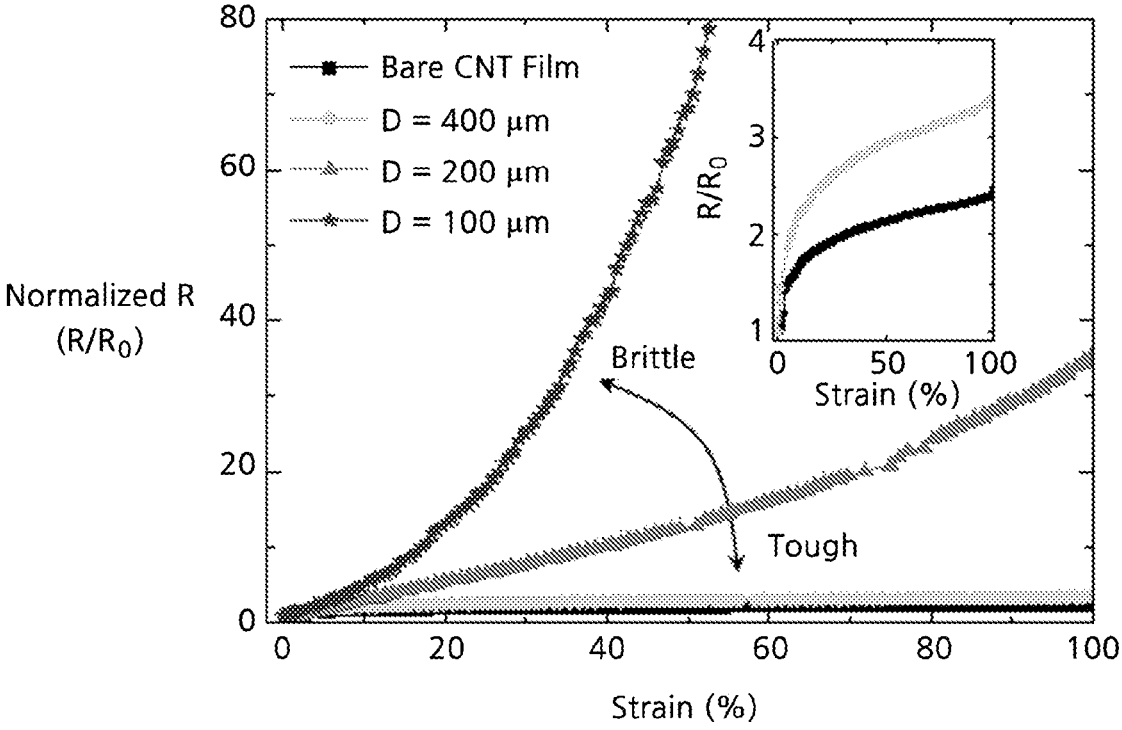

FIG. 4B is a schematic view illustrating a state of cracking of a SWCNT thin-film with an array of stress concentration structure formed on a PDMS stretchable substrate. FIG. 4C illustrates a change in resistance with tension of the conductive thin-film, in each case, depending on the spacing between the structures.

As described above, as the spacing of the stress concentration structure is closer together, the conduction path is more effectively blocked, resulting in a more rapid change in resistance with tension. The form of change in resistance of the conductive thin-film may be controlled by changing the arrangement of the structure.

Figure 5A:
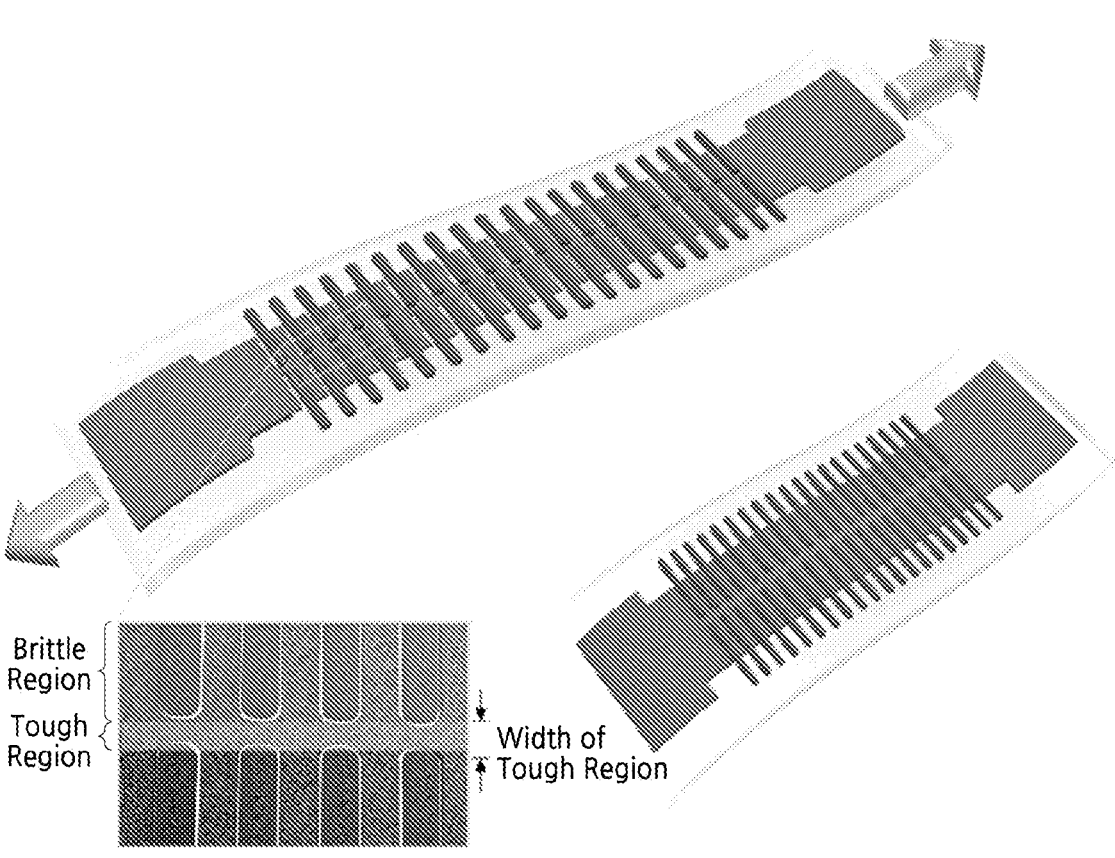
FIGS. 5A and 5B are graphs for describing a change in pressure with a stress concentration structure applied and an operation of a strain sensor.
Figure 5B:
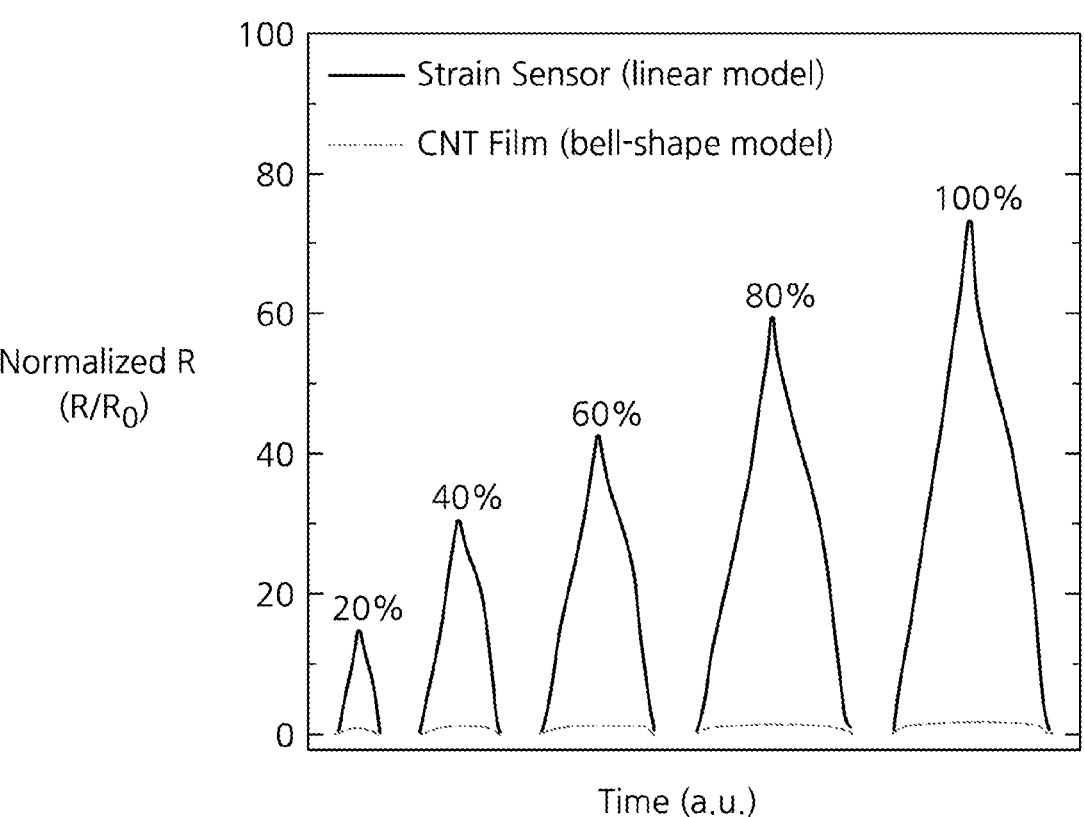

FIGS. 5A and 5B illustrate an operation of the sensor with the arrangement of the stress concentration structure applied. The stress concentration structure may be applied as a pressure or strain sensor according to a tensile environment depending on the selection of materials and optimization of the arrangement of the stress concentration structure. The sensor with the stress concentration structure applied may have very sensitive properties for the same tension, compared to a general conductive thin-film.

Figure 6A:
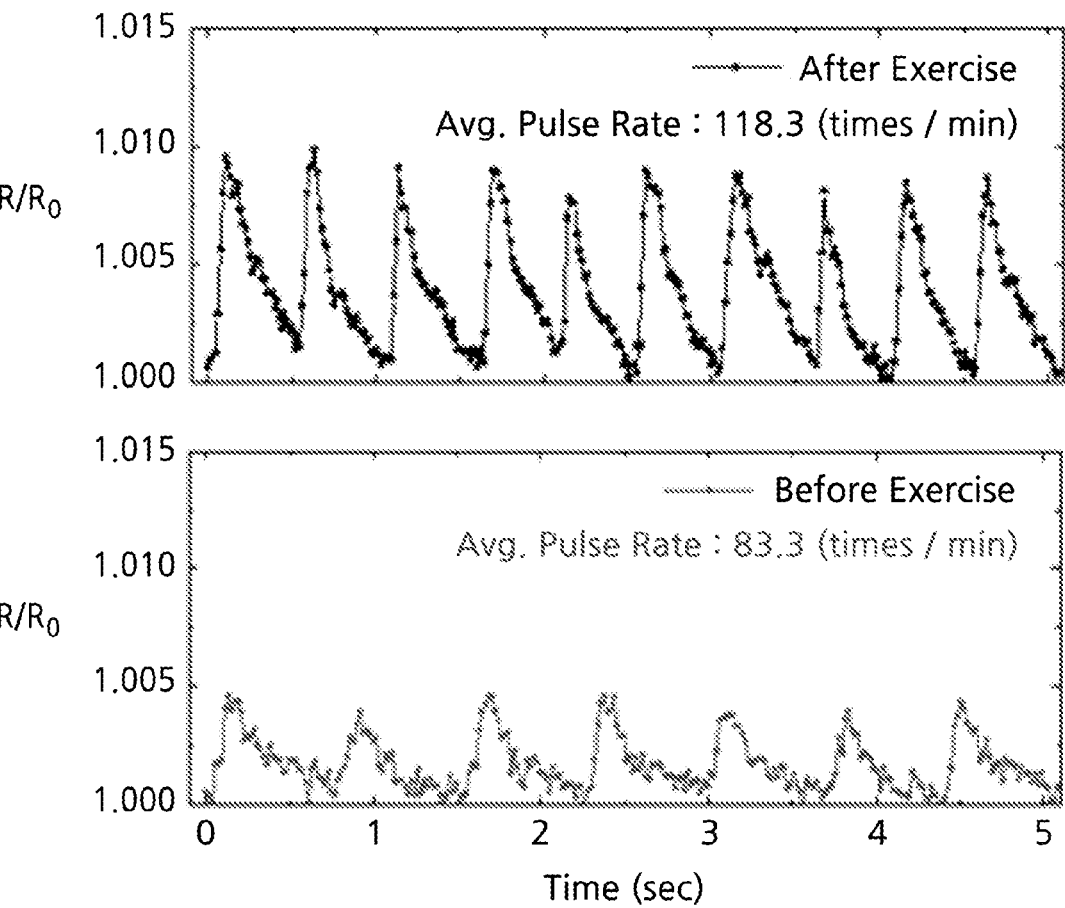
FIGS. 6A to 6C illustrate application examples using a strain sensor manufactured according to the present invention.
Figure 6B:
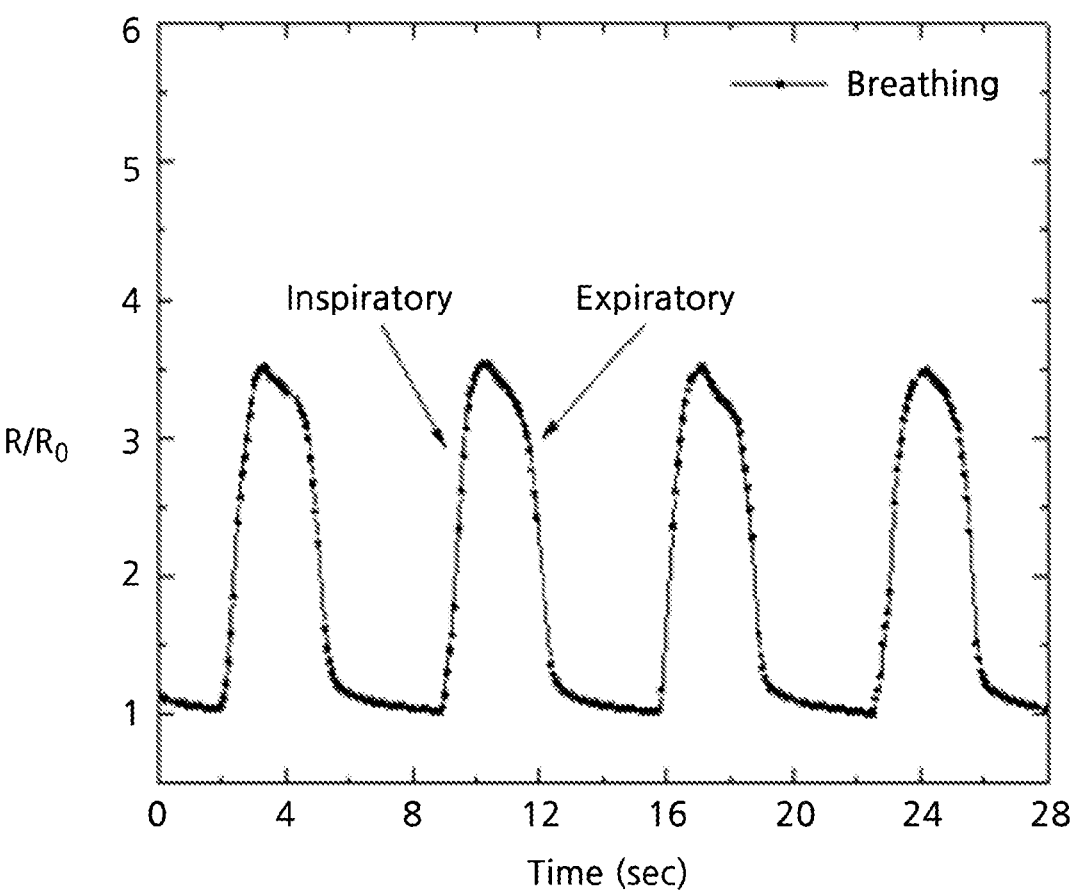
Figure 6C:
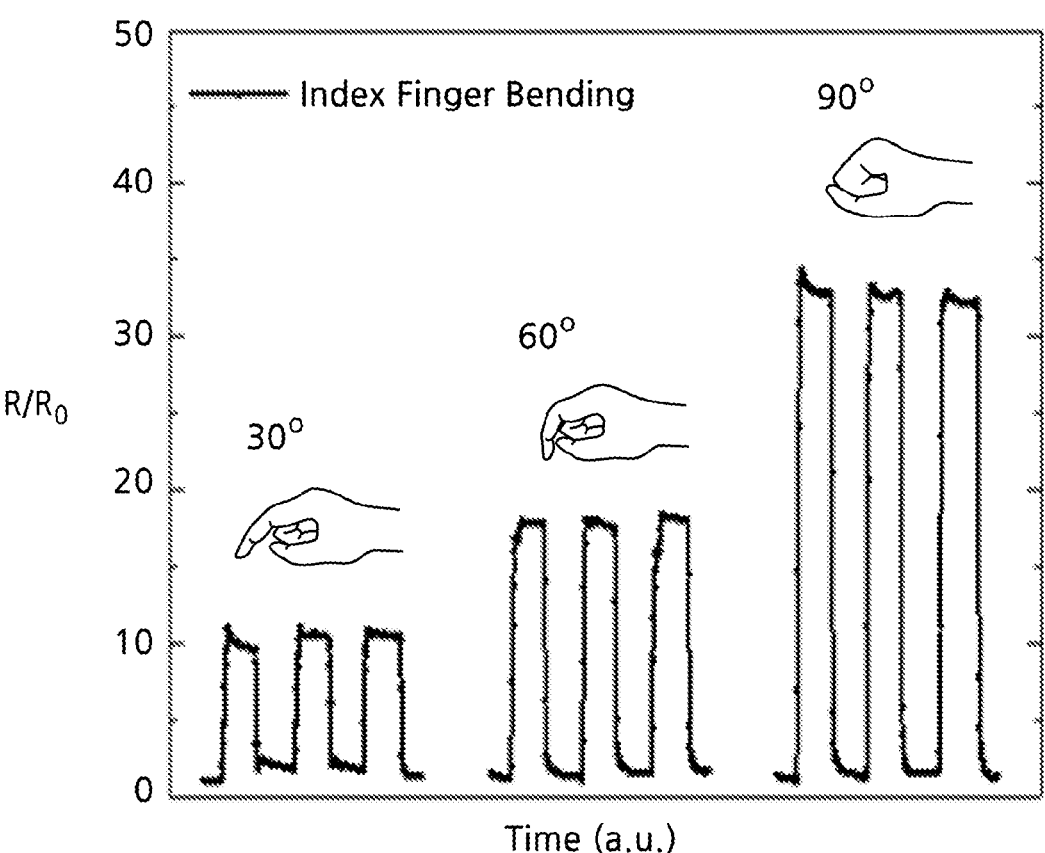

FIGS. 6A to 6C illustrate application examples of using the strain sensor manufactured according to the present invention.

FIG. 6A illustrates that data is detected by detecting a pulse with the sensor attached to the wrist, and FIG. 6B illustrates that respiration is detected by detecting a change in volume of chest pain due to breathing with the sensor attached to the chest. In addition, FIG. 6C illustrates that the movement of a person is detected with the sensors attached to the knee or finger joint.

In addition, the strain sensor manufactured according to the present invention may be attached to the glove to detect finger movement in real time. This sensor may be applied to an HMI device such as AR/VR in the future.

Figure 7:
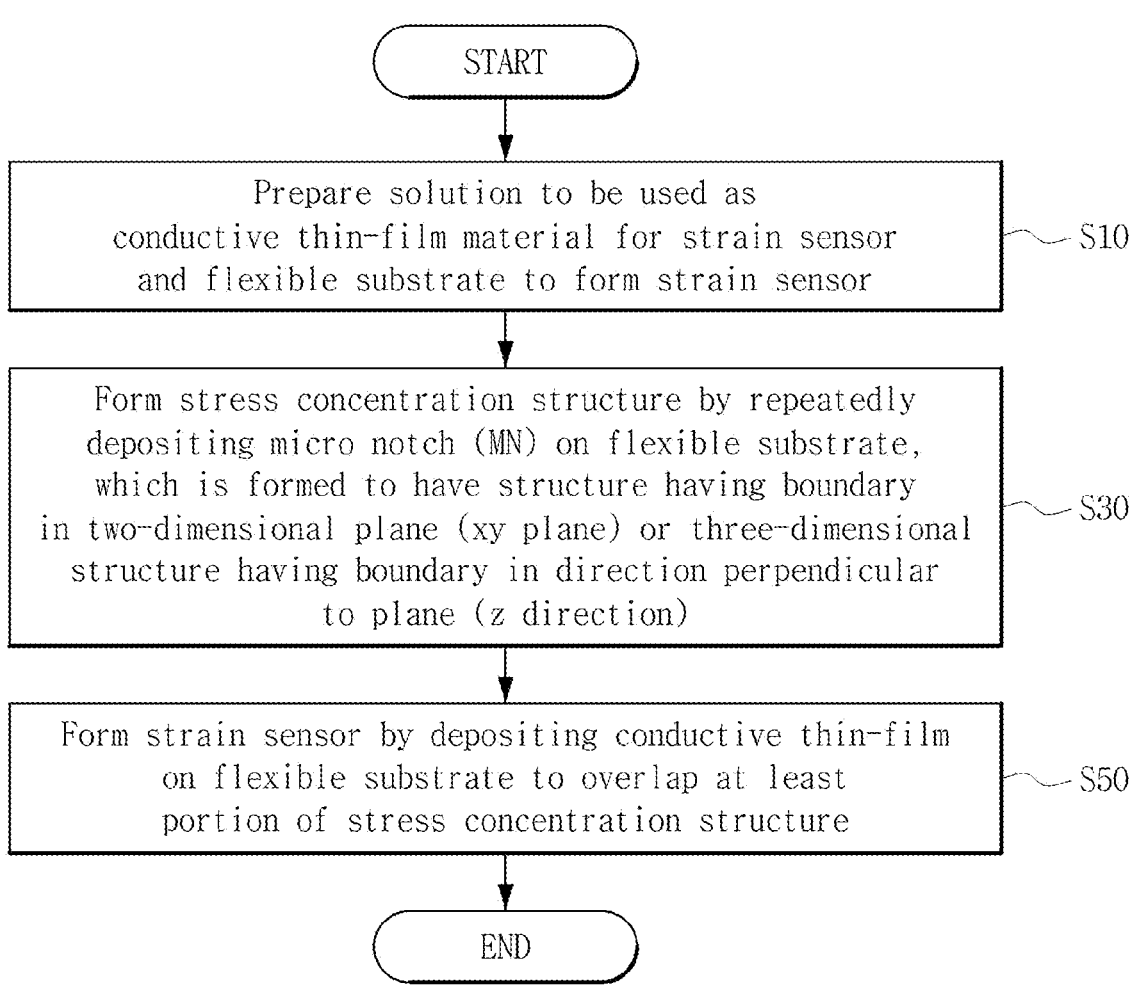
FIG. 7 is a flowchart of a method of manufacturing a strain sensor by control of thin-film crack using a stress concentration structure, according to an embodiment of the present invention.

FIG. 7 is a flowchart of a method of manufacturing a strain sensor by control of thin-film crack using a stress concentration structure, according to an embodiment of the present invention.

With reference to FIG. 7, a method of manufacturing a strain sensor by control of thin-film crack using a stress concentration structure, according to the present embodiment, includes preparing a solution to be used as a conductive thin-film material for the strain sensor and a flexible substrate to form the strain sensor (step S10).

For example, the conductive thin-film material may include silver nanowires (AgNWs), a single-walled carbon nanotube (SWCNT), a multi-walled carbon nanotube (MWCNT), zinc-oxide nanowires (ZnONWs), silver, aluminum, copper, or the like.

In addition, the flexible substrate may include, for example, PDMS, silicone rubber, poly-urethane, ecoflex, Dragon-Skin, stretchable tape, or the like.

The stress concentration structure is formed by repeatedly depositing a micro notch (MN) on the flexible substrate, which is formed to have a structure having a boundary in a two-dimensional plane (the xy plane) or a three-dimensional structure having a boundary in a direction perpendicular to the plane (the z direction) (Step S30).

In the present invention, the stress concentration structure may be formed as a micro notch with a sharp edge or boundary. For example, the stress concentration structure may be patterned as an array structure that has a predetermined spacing in the form of a bar.

In the present invention, the conduction path of a current flowing through the flexible substrate may be controlled by controlling cracks formed on the flexible substrate through an arrangement of micro notches.

That is, as the spacing between the micro notches gets closer, cracks at the boundary of the stress concentration structure merge together which determines a growth length of the crack. These cracks block the conduction path, thereby reducing a current flow.

For example, the micro notch with a sharp boundary may be formed using the processes of printing, molding, deposition, and photolithography, but is not limited thereto.

Subsequently, when the stress concentration structure of step S30 is formed by inkjet printing with SWCNT ink in an embodiment, an ultraviolet ozone cleaning treatment may be performed to change the surface properties of the flexible substrate on which the stress concentration structure is formed.

The strain sensor is formed by depositing the conductive thin-film on the flexible substrate so as to overlap at least a portion of the stress concentration structure (step S50).

In the step of depositing the conductive thin-film to form the strain sensor, a change in resistance of the conductive thin-film in response to stress may be controlled. Specifically, a length and growth rate of the crack on the conductive thin-film may be controlled by adjusting the number and length of micro notches and a thickness of the conductive thin-film. That is, the conduction path of the conductive thin-film may be controlled by controlling the length and growth rate of the crack in the conductive thin-film.

A method of manufacturing a strain sensor by control of thin-film crack using a stress concentration structure, according to another embodiment, may further include rinsing with deionized water and drying with a hot plate, when a single-walled carbon nanotube ink (SWCNT ink) is used.

The present invention relates to a method of controlling a crack that is formed in a conductive thin-film through a stress concentration structure, and to manufacturing of a sensor with the method applied. The sensor manufactured in this method can be applied in various industries such as robotics, medicine, displays, and crack detection in architecture and bridges where physical changes need to be detected.

Applications in wearable devices are typical, and it is possible to detect joint movements such as the hand, knee, and elbow, muscle contraction and relaxation, and breathing from the upward and downward movement of the chest cavity. As described above, the sensor can also be used as a healthcare monitoring device by reading vital signs.

While the present disclosure has been described above with reference to the exemplary embodiments, it may be understood by those skilled in the art that the present invention may be variously modified and changed without departing from the spirit and scope of the present invention disclosed in the claims.

INDUSTRIAL APPLICABILITY

Since the sensor of the present invention can be used with attachment to various parts of the body, the sensor is expected to be widely used in fields such as skin-attached devices, wearable devices, and healthcare devices. It is also expected that the sensor can be applied to devices that require flexible and stretchable environments, such as the newly emerging foldable and rollable devices, etc. and used as an input device with a new mechanical interface.

The invention claimed is:

1. A method of manufacturing a strain sensor by control of thin-film crack using a stress concentration structure, the method comprising:

preparing a solution to be used as a conductive thin-film material for the strain sensor and a flexible substrate to form the strain sensor;

forming the stress concentration structure on the flexible substrate by repeatedly depositing a micro notch (MN), which is formed to have a structure having a boundary in a two-dimensional plane (xy-plane) or a three-dimensional structure having a tapered boundary in a direction (z-direction) perpendicular to the two-dimensional plane; and forming the strain sensor by depositing the conductive thin-film on the flexible substrate so as to overlap at least a portion of the micro-notch (MN), wherein in the forming of the stress concentration structure, a conduction path of current flowing through the flexible substrate is controlled by controlling a crack that is formed on the flexible substrate through an arrangement of micro notches.

2. The method of claim 1, wherein in the forming of the stress concentration structure, the stress concentration structure is patterned into an array structure that has a predetermined spacing in a form of a bar.

3. The method of claim 1, wherein in the forming of the stress concentration structure, as a spacing between micro notches gets closer, cracks at the boundary of the stress concentration structure merge together to determine a growth length of the crack, and the crack blocks the conduction path to reduce a current flow.

4. The method of claim 1, wherein in the forming of the stress concentration structure, the micro notch having a sharp boundary is formed using at least one of processes of printing, molding, deposition, and photolithography.

5. The method of claim 1, wherein in the forming of the strain sensor by depositing the conductive thin-film, a change in resistance in response to stress in the conductive thin-film is controlled.

6. The method of claim 5, wherein in the forming of the strain sensor by depositing the conductive thin-film, a length and growth rate of the crack on the conductive thin-film is controlled by adjusting a number and length of micro notches and a thickness of the conductive thin-film.

7. The method of claim 6, wherein in the forming of the strain sensor by depositing the conductive thin-film, a conduction path of the conductive thin-film is controlled by controlling the length and growth rate of the crack in the conductive thin-film.

8. The method of claim 1, further comprising:

rinsing with deionized water; and drying with a hot plate, when a single-walled carbon nanotube ink (SWCNT ink) is used.

9. The method of claim 1, wherein the conductive thin-film material comprises at least one of silver nanowires (AgNWs), a single-walled carbon nanotube (SWCNT), a multi-walled carbon nanotube (MWCNT), zinc-oxide nanowires (ZnONWs), silver, aluminum, or copper.

10. The method of claim 1, wherein the flexible substrate comprises at least one of PDMS, silicone rubber, polyurethane, ecoflex, Dragon-Skin, or stretchable tape.

11. A strain sensor manufactured using the method of manufacturing the strain sensor by control of the thin-film crack using the stress concentration structure according to claim 1.

12. A method of manufacturing a strain sensor by control of thin-film crack using a stress concentration structure, the method comprising:

preparing a solution to be used as a conductive thin-film material for the strain sensor and a flexible substrate to form the strain sensor;

forming the stress concentration structure on the flexible substrate by repeatedly depositing a micro notch (MN), which is formed to have a structure having a boundary in a two-dimensional plane (xy-plane) or a three-dimensional structure having a tapered boundary in a direction (z-direction) perpendicular to the two-dimensional plane; and forming the strain sensor by depositing the conductive thin-film on the flexible substrate so as to overlap at least a portion of the micro notch (MN), wherein in the forming of the strain sensor by depositing the conductive thin-film, a change in resistance in response to stress in the conductive thin-film is controlled, and wherein in the forming of the strain sensor by depositing the conductive thin-film, a length and growth rate of the crack on the conductive thin-film is controlled by adjusting a number and length of micro notches and a thickness of the conductive thin-film.

13. The method of claim 12, wherein in the forming of the strain sensor by depositing the conductive thin-film, a conduction path of the conductive thin-film is controlled by controlling the length and growth rate of the crack in the conductive thin-film.

* * * * *